Patented May 26, 1953

2,640,032

UNITED STATES PATENT OFFICE 2,640,032

HEAT TRANSFER LIQUID OF DISPROPORTIONATION MIXTURE OF ALKYL ORTHOSILICATES

Ettore Da Fano, Pasadena, Calif., assignor to John B. Pierce Foundation, New York, N. Y., a corporation of New York No Drawing. Application November 17, 1950, Serial No. 196,342

5 Claims. (Cl. 252—78)

This invention relates to preparation of a heat transfer fluid which is especially adapted, among other purposes, for use as a coolant in automobile radiators, and, more particularly, to certain tetra orthosilicates having a branched chain butyl radical and compositions comprising them.

A heat transfer fluid for automobile or the like cooling systems should be free flowing and stable up to a temperature of at least about 375° F., down to the lowest atmospheric temperature encountered in service. In addition, it should be very resistant to hydrolysis in the presence of water.

The Johnston U. S. Patent No. 2,335,012 discloses tetraaryl orthosilicates and their preparation and mixtures comprising tetraaryl orthosilicates. The tetraaryl orthosilicates, however, are more or less unstable toward hydrolysis in the presence of water. Even a very small degree of instability will render the orthosilicate unsuitable for use in an automobile cooling system, because the hydrolyzed products are water insoluble. Thus, this instability may quite readily lead to clogging of the cooling system if a small amount of water were present when the fluid is added, or if the water were subsequently added by mistake or through condensation. Since it is extremely difficult or practically impossible to remove the hydrolysis product formed when the orthosilicates are so decomposed, the automobile radiator and engine block may be ruined thereby.

It has been found in accordance with the invention that a composition consisting essentially of tetra orthosilicates having certain branched chain butyl radicals has the desired very high stability to hydrolysis by water, combined with high fluidity up to about 375° F. and at low temperatures. Therefore this composition is an ideal heat transfer fluid for an automaobile cooling system.

The two branched chain butyl radicals which may be employed in the orthosilicates of the invention, are secondary butyl:

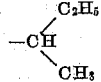

and isobutyl:

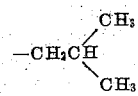

It is preferred to employ secondary butyl in the orthosilicates, but isobutyl may in many cases be substituted for a part of the secondary butyl radicals with good results.

The structure of these branched chain butyl orthosilicates may be exemplified by that of tetra (secondary butyl) orthosilicate, which has the following structure:

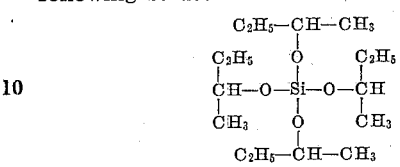

The preparation of the above mentioned branched chain butyl tetraorthosilicates may be represented as follows:

$$4ROH + SiCl_4 \rightarrow (RO)_4Si + 4HCl$$

where R is secondary butyl alcohol or a mixture thereof with isobutyl alcohol.

If a mixture of isobutyl and sec-butyl alcohols is used in the preparation, the following compounds are possible:

1. Tetraisobutyl orthosilicate:

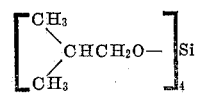

2. Triisobutyl mono(sec-butyl) orthosilicate:

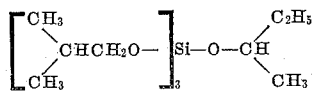

3. Diisobutyl di(sec-butyl) orthosilicate:

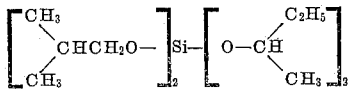

4. Monoisobutyl tri(sec-butyl) orthosilicate:

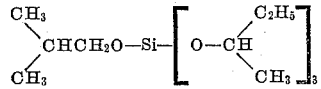

5. Tetra(sec-butyl) orthosilicate:

$$(C_4H_9O)_4Si$$

It will be noted that the Si—O linkages of these compounds are at the central part of the molecule and are more or less completely shielded by the ethyl and methyl side chain groups of the branched chain butyl groups. It is thought that the resulting steric hindrance, which tends to prevent other attacking substances from reaching the central part of the molecule, may account for the stability of the compounds to hydrolysis. The ratio of the number of sec-butyl radicals in gram radical weights to the number of other radicals in gram molecular weights should be such that at least one gram radical weight of the sec-butyl radical per 4 gram radical weights of silicon is present; if the balance is isobutyl there should be at least one sec-butyl radical to each 15 isobutyl radicals. Up to 16 gram radical weights of the sec-butyl radical per 4 gram radical weights of silicon may be present. In view of the lower cost of sec-butyl alcohol, and the excellent hydrolysis resistance of secondary butyl silicate, it will be readily apparent that it is advantageous to keep the amount relatively large.

The following proportions of isobutyl and sec-butyl radicals in the mixture of the silicates fall within the requirements of the invention and have been found to have the desired fluidity or low viscosity at low temperatures, the desired high boiling point and the desired stability against hydrolysis in the presence of water:

*Radicals*

[Gram radical weights]

| Example No. | Isobutyl | Sec-butyl | Silicate (SiO4) |
|---|---|---|---|
| 1 | 15 | 1 | 4 |
| 2 | 10 | 6 | 4 |
| 3 | 11 | 5 | 4 |
| 4 | 8 | 8 | 4 |
| 5 | 4 | 12 | 4 |
| 6 | 0 | 16 | 4 |

Orthosilicates comprising the branched chain butyl radicals are derived from the corresponding alcohols, and these alcohols are somewhat more expensive than isopropyl alcohol. Thus for commercial purposes it is ordinarily desirable to introduce the isopropyl radical in place of one or more of the branched chain butyl radicals. If the amount of the isopropyl radical is too large there is a danger of partial crystallization at low temperatures. A larger amount also lowers the boiling point. In consequence, as few isopropyl radicals as possible should be introduced commensurate with the cost of the finished compound.

Mixtures of isopropyl radicals with the branched chain butyl radicals can be so constituted as to have desirable properties, including a very low freezing point, viscosity and high resistance to hydrolysis. Satisfactory compositions may be prepared containing a mixture of isopropyl and secondary butyl radicals, or a mixture of isopropyl, secondary butyl, and isobutyl radicals. If a mixture of isopropyl, secondary butyl and isobutyl radicals are used in the composition, the following compounds are possible:

Tri (isopropyl) secondary butyl orthosilicate
Tri (isopropyl) isobutyl orthosilicate
Di (isopropyl) secondary butyl isobutyl orthosilicate
Di (isopropyl) disecondary butyl orthosilicate
Di (isopropyl) diisobutyl orthosilicate
Mono (isopropyl) secondary butyl diisobutyl orthosilicate
Mono (isopropyl) triisobutyl orthosilicate
Mono (isopropyl) isobutyl disecondary butyl orthosilicate
Tri (secondary butyl) isopropyl orthosilicate
Di (secondary butyl) diisobutyl orthosilicate
Tri (isobutyl) secondary butyl orthosilicate
Tri (secondary butyl) isobutyl orthosilicate Satisfactory compositions containing isopropyl, secondary butyl and isobutyl radicals are as follows:

| Example No. | Secondary Butyl | Isobutyl | Isopropyl | Silicate |
|---|---|---|---|---|
| 7 | 4 | 4 | 8 | 4 |
| 8 | 8 | 4 | 4 | 4 |
| 9 | 8 | 6 | 2 | 4 |
| 10 | 4 | 8 | 4 | 4 |
| 11 | 6 | 0 | 10 | 4 |
| 12 | 12 | 0 | 4 | 4 |

Example 11 represents the maximum amount of isopropyl alcohol that will insure complete liquidity at very low temperatures. These compounds have satisfactory hydrolysis resistance, low freezing point and high viscosities, but their boiling points are somewhat lower than the orthosilicates consisting entirely of the branched chain butyl radicals.

The boiling point, and viscosity of these compositions are given in the following table:

| Example No. | Boiling Pt., °F. | Viscosities (centistokes) at— | | | |
|---|---|---|---|---|---|
| | | −50° F. | 0° F. | 100° F. | 200° F. |
| 1 | 491 | 36 | 8.9 | 2.0 | 0.96 |
| 2 | 486 | 33 | 8.5 | 2.0 | 0.96 |
| 3 | 486 | 34 | 8.2 | 2.0 | 0.96 |
| 4 | 484 | 31 | 8.3 | 2.0 | 0.96 |
| 5 | 482 | 28 | 7.9 | 2.0 | 0.96 |
| 6 | 478 | 26 | 7.5 | 2.0 | 0.96 |
| 7 | 430 | 18 | 5.5 | 1.5 | 0.79 |
| 8 | 455 | 24 | 6.7 | 1.8 | 0.88 |
| 9 | 471 | 21 | 6.2 | 1.7 | 0.84 |
| 10 | 459 | 26 | 7.0 | 1.8 | 0.85 |
| 11 | 414 | 10 | 3.0 | 1.3 | 0.71 |
| 12 | 451 | 21 | 6.4 | 1.8 | 0.87 |

From a consideration of the above tables it will be seen that the desirable properties of these orthosilicates, in particular, their viscosity, stability, and fluidity over a wide temperature range, suit them ideally as heat transfer media.

The desired heat transfer fluid for use as a coolant in an automobile may be made by reacting silicon tetrachloride with sec-butyl alcohol (to make Example No. 6) or, in making Examples Nos. 1 to 5, and 7 to 12, by reacting silicon tetrachloride with the desired mixture of isopropyl, isobutyl and sec-butyl alcohols or by mixing tetraisopropyl orthosilicate, tetraisobutyl orthosilicate and tetra (sec-butyl) orthosilicate in the desired proportions and then carrying out the disproportionation reaction.

In making the silicates from alcohols and silicon tetrachloride, it is preferred that the reaction be conducted out of contact with iron. The alcohol or mixture of alcohols is reacted with silicon tetrachloride in the desired proportions, preferably using an excess of alcohol. The silicon tetrachloride may be added gradually to the alcohol with agitation. The reaction is initially exothermic and efficient cooling is necessary. When the reaction is about half through, it becomes endothermic and heating is necessary. After all of the reactants are mixed, the reaction mixture is heated to drive off the residual by-product hydrogen chloride, and excess alcohol is removed by distillation.

Alternatively, alcohol may be added gradually to the silicon tetrachloride.

Near the end of the reaction, metallic sodium or a sodium compound of one or both of the alcohols (sodium alcoholate) may be added, and this assists in bringing the reaction to completion and removing the last traces of chlorinated compounds.

The reactants may be pure of technical grade materials and may contain small amounts of water, in which case polymers may be formed but their presence does not seem harmful in small amounts since they do not materially affect the stability of the mixture against hydrolysis nor do these small amounts tend to alter materially the viscosity or the solidification or boiling point of the mixture.

The equipment consists of a mechanically agitated reactor which can be heated or cooled at will; an adequate condenser or system of condensers suitable for both reflux and distillation; an acid absorbing trap; an alcohol trap to absorb and react with any entrained $SiCl_4$; a system of drying towers to prevent moisture from entering the reaction chamber; and a means of adding $SiCl_4$.

The reaction vessel is charged with alcohol. The condenser is now connected for reflux to the acid absorber through the alcohol trap which contains 10% excess of the total weight of the alcohol. The drying towers are placed so that no moisture can enter the system from the alcohol trap to the $SiCl_4$ addition container.

The reactor is now cooled to between 0°–5° C., at which point the $SiCl_4$ is added at such a rate that the pot temperature does not exceed 25° C. The reaction, for the first half, is exothermic, mainly due to the heats of formation and solution of HCl, the main by-product; the second half, which is endothermic, due to the heat of dissolution of HCl, begins when the temperature is such that HCl is no longer being dissolved in the reaction mixture. This point is usually reached when slightly more than half of the $SiCl_4$ has been added. A small amount of water-insoluble gas (propylene-like odor) comes over in conjunction with the HCl evolution.

The addition of $SiCl_4$ takes from 4½ to 6½ hours, depending on the amounts and the efficiency of the cooling system and the capacity of the HCl absorber. After the endothermic phase of the reaction begins the $SiCl_4$ rate of addition can be speeded appreciably.

When the $SiCl_4$ has all been added, the reactor cooling system is stopped. The liquid is brought slowly to room temperature and then heated to expel all HCl (ca. 125° C.). The reaction mixture is then allowed to reflux for at least ten (10) hours, but preferably longer.

The condenser is now arranged for distillation, and the unreacted materials are stripped off. The reactor is allowed to cool.

If desired, 10% excess alcohol may be added, and the whole brought to reflux. After refluxing for 12 hours, or more, the excess alcohol is stripped off. The volume of alcohol stripped off at this point may be less than the original volume.

After the reaction is complete, the reaction mixture is washed with water until the water phase is neutral to lithmus. The liquid is then dried over "Drie-rite" ($CaSO_4$) and filtered. The resultant silicate is a clear straw liquid of pleasant odor. The yield is between 90–95 per cent of theory.

It is important to note that the automotive coolant does not need to be distilled, except for topping off the excess alcohol used. The material is sufficiently purified by washing it thoroughly with water, using one of the washing devices already used for similar purposes. Three washings are recommended. The first water hydrolyzes and removes any chlorosilicate present, either because it was formed by the synthesis of because it was added as a catalyst. Gelatinous silicic acid deposits on the interface between water aand silicate. It is easily removed by separation in a device of the general shape of a separatory funnel. At the same time some dark colored impurities contained in the crude material are removed and the resulting liquid is much lighter in color than the crude material. The wash water on which the silicate floats is acid because of HCl. After the second washing, the water is practically neutral but may occasionally contain small amounts of acid. A third washing assures neutrality. Because of the resistance of the composition to hydrolysis, there is no deleterious effect due to washing.

*Example 1*

A reaction vessel was charged with 4 mols of sec-butyl alcohol. The reaction vessel was equipped with a mechanical agitator and could be heated or cooled at will. It was provided with a condenser system suitable for both reflux and distillation, as well as an alcohol trap to absorb and react with any entrained silicon tetrachloride. The reaction vessel was also provided with a suitable drying tower leading to the atmosphere to prevent moisture from entering the reaction chamber.

After charging the alcohol to the reaction vessel, the mixture was agitated and the condenser connected with reflux to the acid absorber through the alcohol trap which contains 10% excess of the total weight of the alcohol, and the drying towers adjusted so that no moisture could enter the system.

The reaction vessel was cooled to about 0° C., at which point the silicon tetrachloride was added at such a rate that the temperature did not exceed 25° C. The first portion of the reaction is highly exothermic and the addition of the silicon tetrachloride takes some time depending upon the cooling facilities. After 1 mol of silicon tetrachloride had been added, the reaction system was brought to room temperature and heated to a temperature of about 125° C. to expel hydrogen chloride. The reaction mixture was then allowed to reflux for several hours.

The condenser was then arranged for distillation and any unreacted materials stripped off and the reaction mixture cooled. If desired, excess alcohol may be added and refluxed and then stripped off.

After the reaction was complete, the reaction mixture was washed with water until the water phase was neutral and the liquid then dried and filtered. The resultant silicate was a clear liquid of pleasing odor, which is obtained in yield approaching theoretical.

The liquid has a boiling point of 478° F. and is a clear fluid at −65° F. It has a viscosity of 26 centistokes at −50° F., 7.5 centistokes at 0° F., 2.0 centistokes at 100° F., and 0.96 centistoke at 200° F.

*Example 2*

A reaction vessel was charged with 1 mol of isopropyl alcohol and 3 mols of sec-butyl alcohol. The reaction vessel was equipped with a mechanical agitator and could be heated or cooled at will. It was provided with a condenser system suitable for both reflux and distillation, as well as an alcohol trap to absorb and react with any entrained silicon tetrachloride. The reaction vessel was also provided with a suitable drying tower leading to the atmosphere to prevent moisture from entering the reaction chamber.

After charging the mixture of alcohols to the reaction vessel, the mixture is agitated and the condenser connected with reflux to the acid absorber through the alcohol trap which contains 10% excess of the total combined weights of the alcohol, and the drying towers are adjusted so that no moisture can enter the system.

The reaction vessel is cooled to about 0° C., at which point the silicon tetrachloride is added at such a rate that the temperature does not exceed 25° C. The first portion of the reaction is highly exothermic and the addition of the silicon tetrachloride takes some time depending upon the cooling facilities. After 1 mol of silicon tetrachloride has been added, the reaction system is brought to room temperature and heated to a temperature of about 125° C. to expel hydrogen chloride. The reaction mixture is then allowed to reflux for several hours.

The condenser is then arranged for distillation and any unreacted materials are stripped off and the reaction mixture cooled. If desired, excess alcohols in the same proportions may be added and refluxed and then stripped off.

After the reaction is complete, the reaction mixture is washed with water until the water phase is neutral and the liquid then dried and filtered. The resultant silicate is a clear liquid of pleasing odor, which is obtained in yield approaching theoretical.

In preparing other compositions of the invention by disproportionation, the same general procedure is followed. Amounts of the various orthosilicates to give a mixture of the desired proportions are mixed together and permitted to transesterify or disproportionate. The reaction is slow in the absence of a catalyst but is more rapid under reflux conditions, especially if the last traces of chlorosilicates formed during the reaction are not removed until after the disproportionation is complete. The chlorosilicates act as disproportionation catalysts and can be removed later by washing with water or by treatment with sodium or an alcoholate.

It is important to note that the liquid does not need to be distilled except for removing the excess alcohols. It is sufficiently purified by several washes with water, the first of which removes any chlorine-containing compounds. Because of the resistance of the composition to hydrolysis, there is no deleterious effect due to the water wash. After the washing, it is recommended that the composition be finished by filtering.

All parts and percentages in the specification and claims are by weight.

I claim:

1. A heat transfer medium which is resistant to hydrolysis by water, which is extremely liquid at low temperatures, which has a boiling point above about 414° F., a viscosity at −50° F. within the range of about 10 to 21 centistokes and a viscosity at 200° F. within the range of about 0.71 to 0.87 centistoke, consisting essentially of a disproportionation mixture of isopropyl radical- and butyl radical-containing silicates consisting essentially of tetra-isopropyl orthosilicate, tri-isopropyl mono-sec-butyl orthosilicate, di-isopropyl di-sec-butyl orthosilicate, mono-isopropyl tri-sec-butyl orthosilicate and tetra-sec-butyl orthosilicate, the isopropyl and sec-butyl radicals in the said mixture being in the proportion of from 4 to 10 isopropyl radicals to from 12 to 6 sec-butyl radicals.

2. The heat transfer medium of claim 1 wherein the proportions of isopropyl to sec-butyl radicals is in the ratio of 10 isopropyl radicals to 6 sec-butyl radicals.

3. The heat transfer medium of claim 1 especially adapted for use as an automotive engine coolant in which the proportion of isopropyl to sec-butyl radicals is 4 to 12 and which has a boiling point of about 451° F., a viscosity at about −50° F. of about 21 centistokes and a viscosity at 100° F. of about 1.8 centistokes.

4. The heat transfer medium of claim 1 in which 4 to 8 of the sec-butyl radicals have been replaced by iso-butyl radicals to provide a disproportionation mixture consisting essentially of tetra-isopropyl orthosilicate, tetra-isobutyl orthosilicate, tetra-sec-butyl orthosilicate, tri-(isopropyl) sec-butyl orthosilicate, tri-(isopropyl) isobutyl orthosilicate, di-(isopropyl) sec-butyl isobutyl orthosilicate, di-(isopropyl) di-sec-butyl orthosilicate, di-(isopropyl) di-isobutyl orthosilicate, mono-(isopropyl) sec-butyl di-isobutyl orthosilicate, mono-(isopropyl) tri-isobutyl orthosilicate, mono-(isopropyl) isobutyl di-sec-butyl orthosilicate, tri-(sec-butyl) isopropyl orthosilicate, di-(sec-butyl) di-isobutyl orthosilicate, tri-(isobutyl) sec-butyl orthosilicate and tri-(sec-butyl) isobutyl orthosilicate.

5. The composition of claim 4 in which the proportions of sec-butyl iso-butyl and iso-propyl radicals are 4 to 4 to 8 respectively.

ETTORE DA FANO.

References Cited in the file of this patent

UNITED STATES PATENTS

| Number | Name | Date |
| --- | --- | --- |
| 2,335,012 | Johnston | Nov. 23, 1943 |
| 2,349,338 | Clapsadle et al. | May 23, 1944 |
| 2,566,365 | Pedlow et al. | Sept. 4, 1951 |

OTHER REFERENCES

Backer: "Rec. Trav. Chim. des Pays Bas.," vol. 61 (1942), page 512.

Havill: "Journal of Org. Chemistry," vol. 13 (1948), page 282.